United States Patent [19]

Evans

[11] 4,094,293

[45] June 13, 1978

[54] ENGINE PREOILER AND LUBRICANT RESERVOIR

[76] Inventor: John W. Evans, Rte. 41, Sharon, Conn. 06069

[21] Appl. No.: 677,590

[22] Filed: Apr. 16, 1976

[51] Int. Cl.² .............................................. F01M 1/00
[52] U.S. Cl. ........................... 123/196 S; 123/196 R; 123/196 M; 184/6.3
[58] Field of Search .......... 123/196 R, 196 S, 196 M; 184/6.3; 251/30

[56] References Cited

U.S. PATENT DOCUMENTS

| | | | |
|---|---|---|---|
| 1,786,269 | 12/1930 | Solomon | 123/196 M |
| 2,863,628 | 12/1958 | Rimsha | 251/30 |
| 3,583,325 | 6/1971 | Holcomb | 184/6.3 |
| 3,630,482 | 12/1971 | Beller | 251/30 |

Primary Examiner—Ronald H. Lazarus
Attorney, Agent, or Firm—Jones, Tullar & Cooper

[57] ABSTRACT

A preoiler and lubricating fluid reservoir for use primarily with an internal combustion engine is disclosed. A hollow cylindrical reservoir is provided with an internal slidable piston which divides the cylinder into a compressed air retaining section and a lubricating fluid retaining section. A solenoid controlled valve assembly, which is controlled by the vehicle's oil pressure sensor unit, regulates the flow of lubricating fluid either out of the reservoir either during start up of the engine or in instances of low oil pressure, and into the reservoir during periods of normal engine operation. The valve is structured to insure that oil flow out of the reservoir during preoiling is unrestricted but that refilling of the reservoir is accomplished only after the engine's oil pressure has come up to normal operating level. The system also serves to provide emergency oiling of the engine should the oil pump fail or a loss of oil pressure be encountered.

9 Claims, 1 Drawing Figure

ENGINE PREOILER AND LUBRICANT RESERVOIR

FIELD OF THE INVENTION

The present invention is directed generally to a preoiler and oil reservoir for use with machinery requiring lubrication such as an internal combustion engine. More particularly, the present invention is directed to such a preoiler which utilizes a solenoid actuated valve to control flow of lubricating fluid from the reservoir of the preoiler to the engine and from the engine to replenish the reservoir. Most specifically, the present invention is directed to a preoiler having a valve assembly which is actuated by the engine's oil pressure sensor unit and is structured to control the discharge or refilling of the reservoir so that oil is supplied from the reservoir in an unrestricted manner during preoiling but the reservoir is not recharged until the engine's oil pressure has built up to a normal level, thus insuring that the preoiler does not draw off engine oil until the pressure in the engine has risen to an acceptable level.

The present invention includes a hollow, cylindrical oil reservoir which is divided into two chambers by a slidable piston. Air under pressure is admitted to one chamber and oil is carried in the other. The solenoid actuated valve is secured to the opening of the oil chamber and controls the flow of oil either out of or into the cylinder. An air pressure gauge and an air valve are provided to monitor and regulate the air pressure in the chamber. The cylinder is preferably formed from aluminum and has a capacity of three quarts of oil. While the assembly is intended primarily as a preoiler for conventional road vehicles, it also functions as an oil reservoir which will provide emergency oiling should the engine experience an oil pump failure or the like. Further, the system of the present invention can be adapted to insure adequate lubrication to a race vehicle during periods of low oil pressure caused by hard cornering or braking.

DESCRIPTION OF THE PRIOR ART

The use of various preoiling devices and oil reservoirs or accumulators in conjunction with the internal combustion engines is generally well known. It has long been an acknowledged fact that a great deal of engine wear occurs as a result of "cold start scuffing"; i.e., the starting of the engine after it has been idle for a period of time sufficient to allow the lubricating oil to run down into the engine's oil pan and crankcase thus leaving many vital engine parts with no lubricant protection until the engine has been started and the oil pressure brought up to an acceptable level by the oil pump. Accordingly, any number of preoiling assemblies have been proposed, all with the intention of providing oil pressure to the engine prior to start up. However, a number of these preoilers have been bulky, cumbersome, have often required separate pumps, have utilized complex valving arrangements, have been difficult to service, and have generally been unacceptable for use in the normal passenger vehicle.

A number of preoiling assemblies have utilized oil reservoirs in which various springs and flexible diaphragms are required to force the oil out of the reservoir. These systems are often complex and bulky to the extent that they are not practical for use on a conventional passenger vehicle. As the number of moving parts and their complexity of operation increases, so does the incidence of malfunction and the increasing unsuitability of the system for mass usage in today's automobile.

Some prior attempts at providing a preoiling system have utilized a separate oil pump, which may have an auxiliary driving means, for pressurizing the reservoir of the preoiler. This becomes an increasingly complicated, costly, and difficult to maintain system. Such systems also have required power to drive the auxiliary oil pump, increasing the cost of operating the vehicle.

All preoiling systems require some type of valving assembly to control the flow of the lubricating fluid into and out of the preoiler's reservoir. A valve is desired which will allow unrestricted flow from the reservoir upon starting of the engine but which will not allow the reservoir to recharge to the detriment of the engine; i.e., until the engine's oil pressure has reached a normal operating level. Once the engine's oil pressure has come up to a normal level, it is desirable to recharge the reservoir in a expeditious manner to insure its readiness for the next start. Again, attempts to provide such a valving arrangement have resulted in the development of assemblies which utilize large numbers of valves, flow paths, pressure sensors, actuator relays and the like with a result that the valve is too complex and unreliable for extended, service-free life.

Several recent U.S. patents have disclosed engine preoilers in which the reservoir is provided with a solenoid actuated valve assembly. Examples of such patents are U.S. Pat. Nos. 3,422,807 and 3,722,623 to Waldecker, and 3,556,070 and 3,583,525 to Holcomb. In all of these systems, a reservoir has a flexible diaphragm, which may be spring biased, and a valving assembly which includes a solenoid actuator.

A number of the prior devices have required some type of a time delay between the actuation of the vehicle's ignition switch and the engagement of the starter. This time delay has been necessary to give the various valves of the preoiler adequate time to position themselves to allow flow of the oil from the reservoir. Such a time delay is irritating to the driver and may also be dangerous should the vehicle stall and have to be restarted immediately.

In some existing preoiling devices, the assembly can serve only the function of a preoiler, that is it is only actuated in conjunction with the vehicle's starter. It is also desirable to provide a supply of oil which can be used should the vehicle either experience an oil pump failure or a reduction in oil pressure due to other causes. In most present vehicles, once the oil pressure indicating light comes on, the driver can do little or nothing to prevent damage to his engine since the light does not come on until the oil pressure is so low as to give the operator little time to take corrective measures. It would be desirable to so structure the preoiler assembly that it will act as an oil reservoir which is available to supply lubricating fluid under pressure for sufficient period of time to allow the vehicle operator to shut off the engine thereby protecting it.

A final problem with a number of presently available preoilers is that they are difficult if not impossible to charge prior to installation. The first start-up of a new engine is a period when adequate lubrication is particularly important since all the moving parts have not "worn in" and further since there is no residual lubrication remaining on moving parts. Thus it is highly desirable to provide a preoiler which can be charged with oil under pressure before it is placed in the vehicle so that the engine can be lubricated before it is started for the first time. A number of the prior devices cannot easily be charged prior to their installation in the vehicle and hence do not have the ability to preoil the engine prior to its initial start-up.

SUMMARY OF THE INVENTION

It is accordingly an object of the present invention to provide a preoiler and lubricant reservoir which overcomes the disadvantages of the prior art.

A further object of the present invention is to provide a preoiler which is compact, uncomplicated, has few moving parts and is virtually maintenance free.

Yet another object of the present invention is to provide a preoiler having a solenoid controlled valve means which allows unrestricted discharge of the oil during preoiling but which controls the rate of recharge of the reservoir.

Still a further object of the invention is to provide a preoiler which will supply pressurized oil useable in case of failure of the oil pump or loss of engine oil pressure.

A final object of the present invention is to provide a preoiler which may be easily charged before being placed in the vehicle.

As will be discussed in greater detail in the description of a preferred embodiment, the preoiler in accordance with the present invention includes a hollow cylinder, preferably of aluminum, and having a slidable piston therein. The piston divides the cylinder into two chambers with air under pressure being carried in one chamber and with lubricating oil being carried in the other. A solenoid actuated valve controls the flow of oil into and out of the chamber. The valve assembly which has only two moving parts, the solenoid's core and a flexible diaphragm, is effective to provide unrestricted flow to the engine during preoiling yet restricts recharging of the unit until the engine's oil pressure has come up to a normal level. In comparison to the prior devices, the preoiling assembly of the present invention is compact, has only three moving parts and only one oil flow line and may be placed at any location in the vehicle.

The oil reservoir of the present invention; i.e., the aluminum cylinder, is provided with a very smooth, roller burnished bore so that the piston slides easily and freely. This uncomplicated reservoir insures that the oil will be delivered quickly and without the possibility of spring failure and diaphragm rupture which may accompany the prior reservoirs. There is no wear and the reservoir is maintenance free over the life of the vehicle. The air chamber is provided with a suitable air valve and may also have a pressure gauge so that the pressure can be easily checked. In this way a quick check can be made to insure that the assembly is functioning properly. The pressure on the oil can be easily regulated by varying the volume of air in the air chamber.

The solenoid actuated valve assembly is structured to insure that during preoiling the flow out of the reservoir is rapid and unobstructed. However, as the engine starts to run, this same valve restricts flow of oil back into the cylinder until the engine oil pressure has reached its normal level, as sensed by the oil pressure sensor. The reservoir is then recharged but cannot discharge until the oil pressure drops below a set level. This is all accomplished by a valve unit having only two moving parts. This again is in contrast to the complex valving structures of a number of the prior devices. The valving assembly is so rapid in its operation that no time delay is required between actuation of the ignition switch and engagement of the starter. As soon as the switch is actuated, the solenoid valve opens the reservoir and oil under high pressure is distributed to all parts of the engine even before the starter is engaged.

The preoiler of the present invention serves also as an oil reservoir for providing a reserve of lubricating oil which can be supplied to the engine in the event of a drop in oil pressure for any reason. Since the assembly's solenoid valve is connected electrically in parallel with the engine's oil pressure sensor, any drop in pressure sufficient to illuminate the oil pressure warning light will also open the valve on the preoiler to provide additional lubricating oil for the engine for sufficient length of time to allow the driver to shut off the engine before it is damaged by operation without lubrication. In this respect, the preoiler of the present invention is also suitable for use on a race vehicle where intermittent drops in oil pressure may be caused by hard cornering, braking, or accelerating. In these cases, the preoiler acts as a reservoir and provides additional oiling as needed without the difficulties associated with a large oil pan.

Since the preoiler of the present invention does not depend on springs or resilient diaphragms to force the oil out of the unit, but instead uses air pressure, it is easy to charge the unit prior to installing it in a vehicle. In this situation, the oil is first placed in the cylinder, which is then closed by attaching the valve. The air chamber, which has not previously been charged, is pressurized with compressed air. The unit is fully charged and can be installed in this pre-charged mode so that before a new engine is started for the first time, it is provided with a supply of oil.

BRIEF DESCRIPTION OF THE DRAWINGS

While the novel features of the present invention are set forth with particularity in the appended claims, a full and complete understanding of the preoiler of the present invention may be had by referring to the description of a preferred embodiment as set forth hereinafter and as shown in the accompany drawings in which:

DESCRIPTION OF A PREFERRED EMBODIMENT

Figure 1:
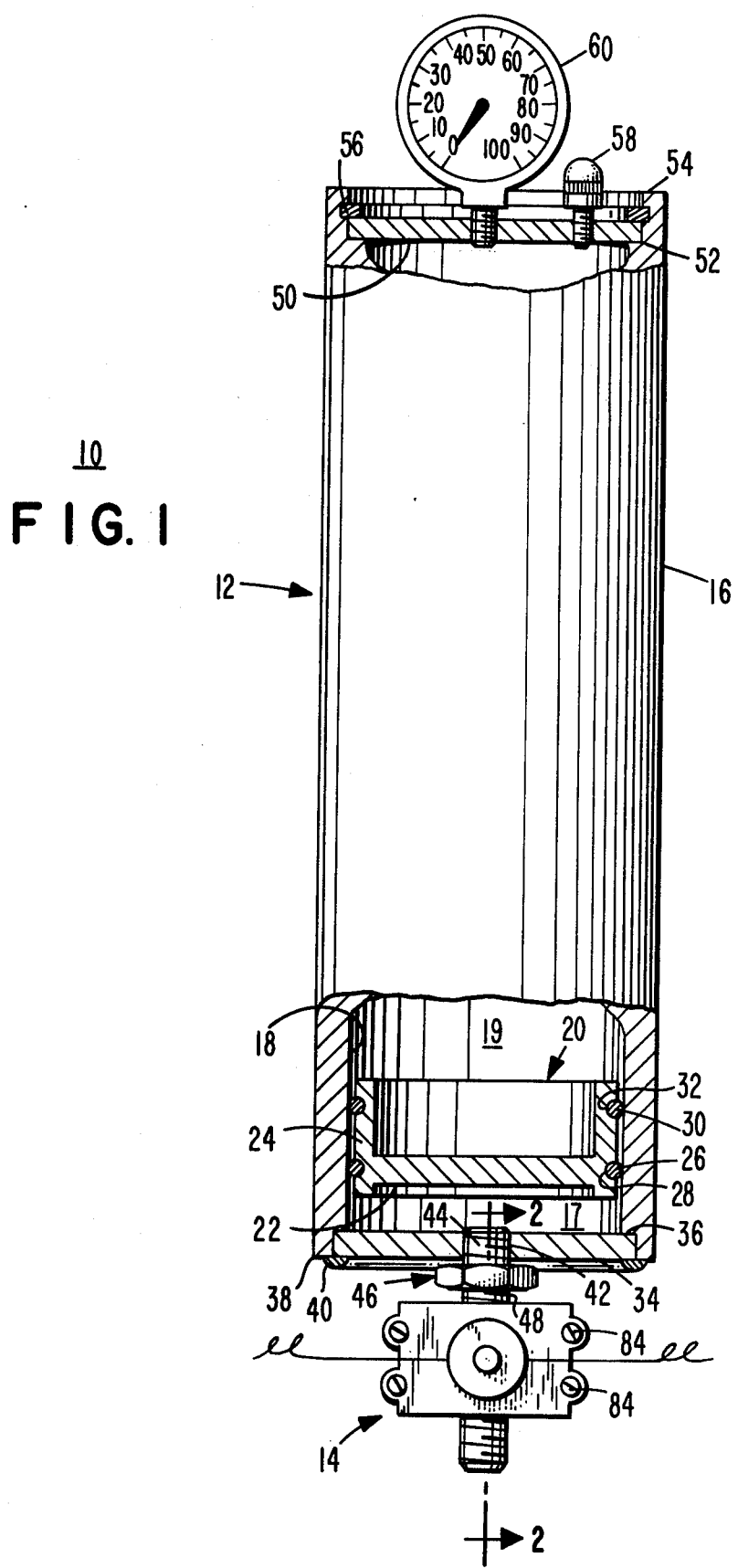
FIG. 1 is a top plan view, partly in section, of a preferred embodiment of the preoiler cylinder, piston, and valve in accordance with the present invention.
Figure 2:
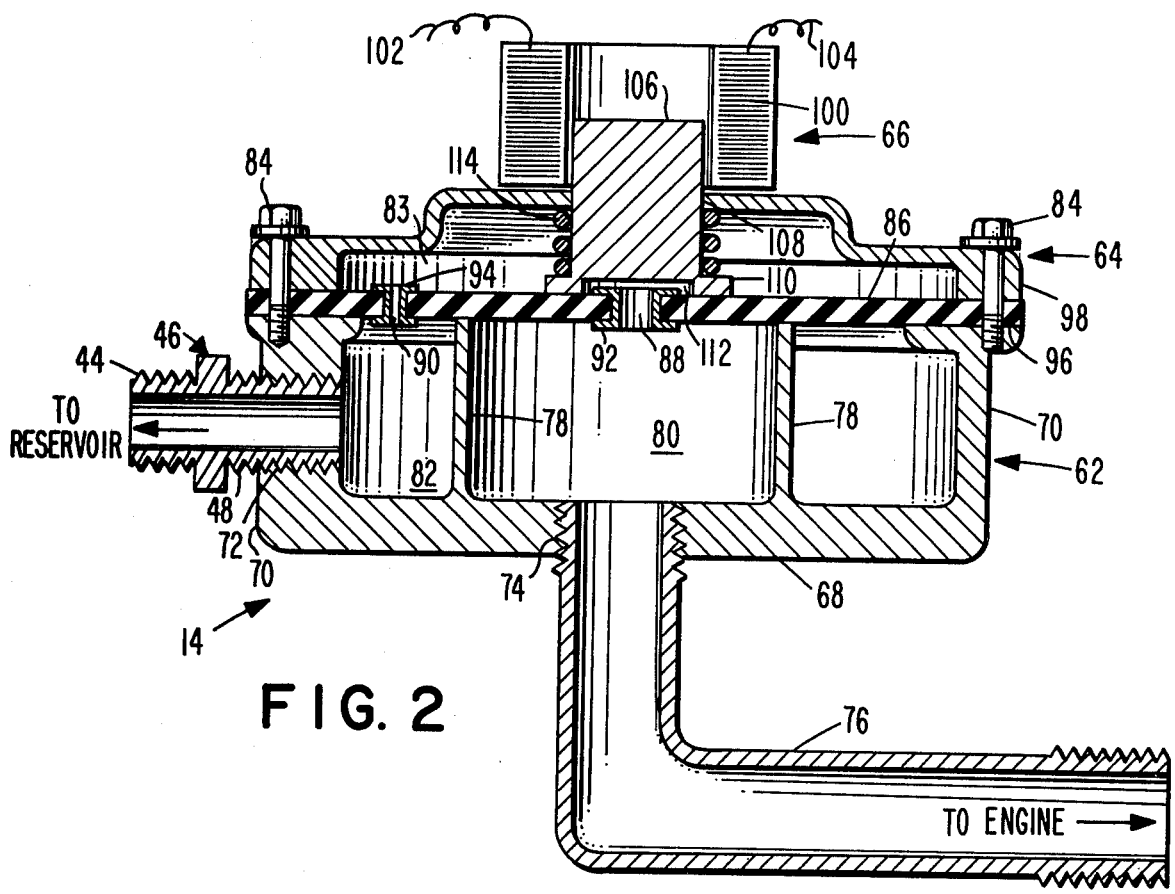
FIG. 2 is a side elevation cross sectional view, taken along line 2—2 of FIG. 1, and shows the solenoid actuated valve assembly of the present invention with the core of the solenoid in a de-energized position.

Turning now to FIG. 1, there is shown generally at 10, a preferred embodiment of an engine preoiler and lubricant reservoir in accordance with the present invention. Preoiler 10 is comprised of an oil reservoir 12 and a solenoid actuated valve assembly 14 which may also be seen in cross section in FIG. 2.

Oil reservoir 12 is, as may be seen in FIG. 1, a cylindrical hollow tube 16 which, in the preferred embodiment, is formed of aluminum, has an overall length of 21 inches, with an O.D. of 4½ inches and a capacity of 3 quarts of oil. It will, of course, be recognized that the actual dimensions of cylinder 16 may be varied to change the capacity of the reservoir. Cylinder 16 has an interior wall portion 18 which is roller burnished and hardened to 49RC. A generally cup shaped piston 20, having a head portion 22 and a side skirt portion 24, is slidably positioned in cylinder 16, again as may be seen in FIG. 1, and divides cylinder 16 into first and second sections 16 and 19, respectively. A circular oil seal 26 is carried in a first peripheral groove 28 in the skirt 24 of piston 20 near the head end 22 of the piston. A circular air seal 30 is carried in a second peripheral groove 32 in the skirt 24 of piston 20 at a portion of the skirt 24 away from the head 22 of piston 20. These two seals may be made of any suitable material which will be impervious to oil, alcohol, gasoline and the like and which will allow the piston 20 to slide smoothly along the interior wall 18 of cylinder 16. It will be understood that the spacing of the seals in the grooves and between the piston skirt 24 and in the inner wall 18 has been exaggerated for purposes of illustration. It will further be understood that oil reservoir 12 need not be a cylinder but could have various other shapes. However, a cylinder is preferred.

A first end plate 34 is positioned in a suitable recess 36 at a first end 38 of cylinder 16 and is retained in place by suitable means such as a line of weld 40. First end plate 34 is disc shaped and completely closes the first end 38 of cylinder 16. This plate may be made of similar material as the body of cylinder 16 and is provided with a threaded aperture 42 into which may be screwed a first end 44 of a suitable threaded connector 46. The valve assembly 14 is screwed onto the free end 48 of connector 46. The end plate 34 may thus be seen to be a permanent installation which is not intended to be removed and which cooperates with piston 20 to define the first section 17 of cylinder 16.

A second end plate 50 is positioned in a suitable recess 52 in a second end 54 of cylinder 16. Second end plate 50 is again of the same material as cylinder 16 but is removably secured in place by a resilient snap ring or circlip 56. An air valve 58 is provided in second end plate 50 and allows air under pressure to be added to or removed from the interior of cylinder 16. A suitable air pressure gauge 60 is shown as also being carried on the second end plate 50. It will, of course, be recognized that the pressure gauge 60 could be eliminated, in which case a pressure gauge could be applied to valve 58 when it was desired to read the air pressure in the cylinder. It may thus be seen that oil which is admitted through valve assembly 14 into first section 17 of cylinder 16 will tend to force piston 20 toward the second or gauge end 54 of cylinder 16 thus compressing whatever air may be within the second section 19 of cylinder 16. By either adding or withdrawing air through valve 58, the pressure exerted on the oil by the piston 20 may be varied. This assembly further allows the pre-charging of the reservoir 12 before it is placed into a vehicle. Valve assembly 14 may be removed and three quarts of oil placed in section 17 of the cylinder. The valve assembly 14 may then be replaced and the cylinder pressurized by adding air through valve 58 to section 19. Alternatively, the pressure end plate 50 may be removed by first removing retaining ring 56. Piston 20 is then removed, the oil added, the piston 20, end plate 50, and ring 56 replaced and the cylinder 16 charged with air through valve 58. If it becomes necessary to repair the piston 20 or seals 26 or 30, access to them is gained by removing the ring 56 and pressure end plate 50. Thus it will be seen that reservoir 12 is an uncomplicated assembly which is capable of holding a desired quantity of oil at a specified pressure and of discharging the oil when allowed to by the opening of valve assembly 14. Piston 20 is the only moving part in the reservoir 12 and it is virtually maintenance free. The size of the reservoir is such that it can be placed either in the vehicle's engine compartment or at a remote location such as affixed to a frame member, and takes up little space.

Valve assembly 14 controls the flow of oil or other lubricating fluid either into or out of reservoir 12. The structure of valve assembly 14 may be seen most clearly in FIG. 2 which is a cross-sectional view of the valve assembly taken along line 2—2 in FIG. 1. Valve assembly 14 is comprised generally of a valve body portion 62, a valve cover portion 64 and a solenoid actuator 66. As may be seen in a FIG. 1, the valve body 62 and cover 64 are shown as being generally rectangular although this shape is not necessary. The body could be circular, oval, square or any number of shapes, if desired. Returning to FIG. 2, valve body 62 may be seen to include a bottom portion 68 and upstanding walls 70. One of the walls is provided with a threaded aperture 72 into which is screwed the portion 48 of connector 46 so that valve body 62 is in fluid communication with the reservoir 12. The bottom 68 of valve body 62 is provided with a threaded aperture 74 into which is screwed a suitable connector 76 which is in communication with the engine. At least one interior partition 78 extends upwardly within valve body 62 to the same height as the walls 70 of valve body 62 and serves to divide the valve body into two chambers, a first or inner chamber 80 which is in communication with the engine through aperture 74 and a second or outer surrounding annular chamber 82 which is in communication with reservoir 12 through connection 46. In the preferred embodiment there are four partitions 78 which form a rectangular chamber around threaded aperture 74. However, it is necessary only that the valve body be divided into two chambers with aperture 72 in one and 74 in the other.

Valve cover 64 is generally dome shaped and is secured to the upper portion of the walls 70 of valve body 62 by a number of bolts or screws 84. As may be seen in FIG. 2, a resilient diaphragm 86 is positioned between valve body 62 and cover 64 and is also retained in place by the bolts or screws 84. This diaphragm 86 is generally planar in its unflexed state and abuts the upper ends of interior partition 78 thus further defining first or inner chamber 80 and second or outer chamber 82 in valve body 62 and defining a third chamber 83 as the area above diaphragm 86 and below cover 64. A first aperture 88 passes through diaphragm 86 at a portion of the diaphragm within the perimeter of first chamber 80, and a second aperture 90 passes through the diaphragm at a point within the perimeter of second chamber 82. Both of these diaphragm apertures or orifices are provided with wear inserts or sleeves 92 and 94 so that the flow of oil will not cause the aperture to enlarge or their edges to rip or shred. First aperture 88 is approximately twice as large as second aperture 90. It should also be noted that the upper portion of the walls 70 of valve body 62 terminate in a flange 96 of greater width than the corresponding downwardly extending walls 98 of the valve cover 64. This results in diaphragm 86 having a larger surface area on its side adjacent cover 64 than on its side adjacent body 62. The purpose of the two apertures in the diaphragm and the different surface areas of the diaphragm will be discussed in a subsequent section.

Again referring to FIG. 2, solenoid assembly 66 is seen as being carried on valve cover 65 and includes a conventional field coil 100 having first and second electrical connectors 102 and 104, and a conventional iron armature or plunger 106. Coil 100 is secured by any suitable means to the exterior of cover 64 and plunger 106 passes through a suitable opening 108 in the cover 64 with there being provided suitable gasket means (now shown) to prevent leakage between plunger 106 and opening 108. The lower portion of plunger 106 terminates in an outwardly extending, circumferential lip 110 and an inner recess 112 which surrounds central aperture 88 in diaphragm 86 when the plunger is in its deenergized position. A coil spring 114 surrounds plunger 196 and urges the plunger downwardly to insure a firm seat on diaphragm 86 when the coil 100 is deenergized.

Figure 3:
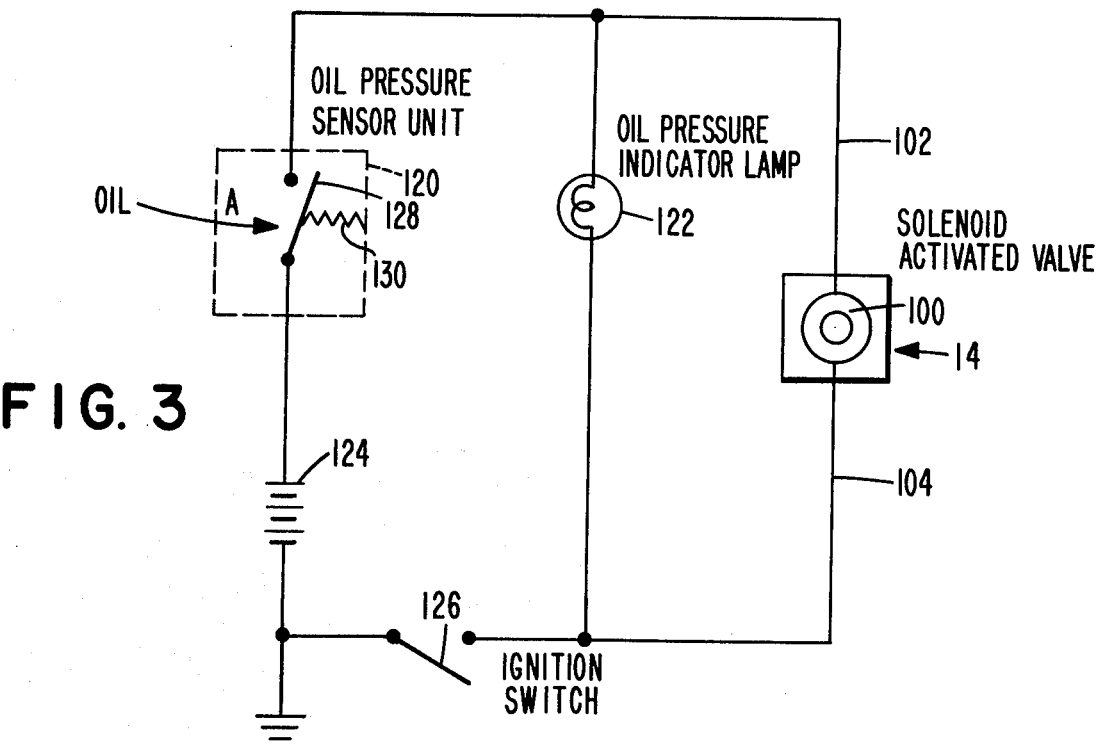
FIG. 3 is a wiring schematic in accordance with the present invention and shows the oil pressure sensor, oil pressure indicator lamp, and solenoid actuated valve being connected in parallel.

Turning now to FIG. 3, there may be seen a schematic representation of the wiring of the preoiler assembly. As may be seen, a conventional oil pressure sensor unit 120, shown in dashed lines, is wired in parallel with a conventional oil pressure indicator lamp 122 and with the coil 100 of the solenoid actuated valve 14. A conventional battery 124 and ignition switch 126 are also included in the circuit. The oil pressure sensor unit 120 is of the type having a switch 128 which is biased by suitable spring means 130 to a closed position to actuate the indicator light 122 until the engine's oil flow, indicated by arrow A, has sufficient pressure to open the switch 128, extinguishing the indicator light 122. By placing the solenoid valve assembly 14 in parallel with the oil pressure sensor 120 and indicator lamp 122, the valve will be energized whenever the ignition switch 126 is closed and the engine's oil pressure is below the level required to put out the indicator light.

In operation, reservoir 12 is filled with approximately three quarts of oil, valve assembly 14 is secured, and the cylinder is pressurized to approximately 80 P.S.I.G. As may be seen in FIG. 2, no oil can leave the preoiler because diaphragm 86 is forced to its closed position by the action of plunger 106 and coil spring 114 pushing the diaphragm downwardly against partitions 78, sealing off the interior of chamber 80. This sealing action is aided by oil from the reservoir passing through connector 46 into chamber 82 and through aperture 90 into the space between the valve cover 64 and diaphragm 86. Oil cannot flow out through aperture 88 as this is sealed off by the sealing flange 110 and recess 112 of plunger 106. Thus there is no oil flow out of the reservoir and into the engine. As the ignition switch is closed, the oil pressure sensor switch 128, which is closed by spring 130 as there is no oil pressure in the engine, allows current to flow to the indicator light 122 and concurrently to the coil 100 of the valve assembly 14. Plunger 106 is pulled up, lifting the lip 110 off diaphragm 86 and opening aperture 88 so that any oil which had flowed into the space above diaphragm 86 will exit through aperture 88. At the same time, the three quarts of oil in reservoir 12 starts to flow through connector 46 into chamber 82 and forces diaphragm 86 up off its sealing engagement with partitions 78 so that the oil enters chamber 80 and flows to the engine through connector 76. It will be recognized that the initiation of oil flow is virtually simultaneous with the closing of the ignition switch and that the engine is supplied with oil even before the starter is engaged.

The starter is engaged and the engine starts to run. During this time, the quantity of oil remaining in cylinder 16 is decreasing and, as piston 20 moves toward the valve end 38 of the cylinder 16, the pressure on this remaining oil also decreases. During this same period, the engine's oil pressure, generated by the oil pump, is increasing but is still not sufficient to switch off the oil pressure sensor switch 128 so the solenoid coil 100 remains energized. As the engine oil pressure becomes greater than the pressure remaining in cylinder 16, oil will start to flow from the engine through conduit 76 into the valve assembly 14. However, during this time while the engine is building up oil pressure but the oil pressure sensor switch 128 has not been forced off, the oil flow should go to the engine and not to recharging reservoir 12. Valve assembly 14 now acts generally as a check valve and prevents a high volume flow into cylinder 16. Since the coil 100 is still energized and plunger 106 is raised, oil can flow through aperture 88 into the chamber between the cover 64 and diaphragm 86. As the pressure in chamber 80 builds up and exceeds the pressure in chambers 82 and 83, the diaphragm partially returns to its closed position seating against partitions 78. This is a result of oil in chamber 80 flowing up through orifice 88 and acting to maintain the diaphragm in seating engagement with partitions 78 which will hence restrict flow into the cylinder 16. As discussed previously, central aperture 88 is approximately twice the area of peripheral aperture 90 thus insuring that oil will flow from chamber 80 into chamber 83 above diaphragm 86 faster than it can flow out through orifice 90 into chamber 82. As was also discussed previously, the surface area of the diaphragm 86 is greater on the cover side than on the valve body side because of the provision of flanges 96. Even when the oil pressure is equal on both sides of the diaphragm, the increased surface area will tend to force the diaphragm down. Finally, since the diaphragm is resilient, it will try to assume its unstressed shape; i.e., flat and will tend to close on partitions 78. All of these factors combine to limit the flow of oil from the engine through the valve to the cylinder while the engine's oil pressure is increasing but before it has reached a pressure sufficient to deenergize the sensor unit switch 128 and hence the coil 100. In this way the reservoir is not replenished rapidly and does not draw oil away from the engine.

As the engine's oil pressure reaches a level sufficient to open the sensor unit's switch 128 and deenergize coil 100, the valve assembly 14 allows the cylinder to rapidly recharge. With coil 100 deenergized, coil spring 114 forces plunger 106 downwardly against diaphragm 86 sealing aperture 88. Because pressurized oil cannot pass through aperture 88, the pressure in chamber 83 tending to close diaphragm 86 will exhaust through aperture 90. Since the oil pressure entering the valve unit from the engine is increasing, diaphragm 86 is now forced upwardly off partitions 78 allowing oil to flow from chamber 80 into chamber 82 and into cylinder 16 where piston 20 slides toward the gauge end 54 compressing the air and storing three quarts of oil under pressure. When the pressure in cylinder 16 becomes equal to the pressure in the engine, oil will flow from the cylinder 16 into the peripheral chamber 82 of valve 14 and through orifice 90 into chamber 83 above diaphragm 86. Since orifice 88 is now sealed by the deenergized plunger 106, the oil pressure in this upper chamber will combine with the force of coil spring 114 to force diaphragm 86 into its closed position. Since the engine's oil pressure is at a maximum when the engine is warming up, the reservoir will be recharged to a high pressure level. As the engine oil pressure decreases to its normal operating level, diaphragm 86 remains closed, holding the oil stored in the cylinder.

It may thus be seen that this valve, which has only two moving parts, performs three functions. It acts first to fully open upon actuation of the ignition switch to preoil the engine before it starts. Then as the engine starts, but while its oil pressure is below a certain level, the valve acts as a check valve and restricts the recharging of the cylinder so that oil is not diverted from the engine. Finally, when the engine oil pressure reaches a certain level, the valve opens to allow the cylinder to be recharged at a rapid rate while at the same time insuring that the oil charged to the cylinder is retained there.

While the preoiler capability of this system is of primary importance, it should be recognized that the oil stored in cylinder 16 can also be utilized in case of a sudden drop in engine oil pressure due to, for example, oil pump failure or an oil line rupture. In such a situation, as soon as the oil pressure decreases to the extent that the oil sensor switch 120 closes, the coil 100 of the valve assembly 14 is energized, allowing oil to flow from cylinder 16 to the engine in the same manner as in the preoiling situation. Should the loss of oil be permanent such as would be caused by a broken pump or a ruptured line, the reserve oil stored in the cylinder 16 will provide the driver approximately 1 minute to shut off his car's engine. Should the loss of oil be only temporary, such as might be the case in the instance of hard cornering or braking which may be necessary in an emergency situation, the preoiler will augment the engine oil flow to maintain pressure and will then recharge in the manner set forth previously.

The ability of the preoiler to augment normal oil flow should there be a temporary reduction in pressure makes the unit beneficial in the situation where the vehicle is periodically subjected to more vigorous usage such as in a sports car which is used for weekend autocrosses, rallys, and the like. In a strictly performance or racing application, the cylinder may be connected to a "T" fitting in an externally routed oil pressure line, which directs oil pressure out of the engine and returns back into the bearings (such as a remote oil cooler and filter system). The unit may then be installed with a manual ball-type valve, instead of the solenoid actuated valve, which provides a more rapid refill after discharge. A one way check valve is placed on the oil pump side of the "T" fitting in the remote line and an indicator light pressure switch is placed on the pump side of the check valve. A mechanical pressure gauge is installed anyplace on the engine after the unit; i.e., on the engine side of the check valve. In this set-up, the unit functions both as a preoiler and will also oil the engine whenever any pressure drop (no matter how small) is encountered either as a result of cornering or braking (surge condition), or a complete mechanical pump system failure (broken pump, pan, or line). If any of these conditions occur, the unit closes the one-way check valve, and oils the engine. At the same time the pressure switch on the pump side of the check valve illuminates a dashboard light alerting the driver to a drop in pump pressure, and that his mechanical engine gauge is reading pressure being delivered from the unit. This will allow the driver of a performance vehicle time to decide if the problem is due to surge (light will go out almost directly after it has illuminated), or is a total system failure (light will remain illuminated). In case of a total system failure, the driver will have time to turn off the engine, preventing extensive damage. The period of protection in performance vehicles has been shown to be about 30 to 45 seconds for 4 and 6-cylinder engines, and about 25-35 seconds for V-8 engines.

It will be seen that the above described system of a cylinder and a solenoid actuated valve is effective to preoil an engine and to act to provide a back-up supply of oil should this become necessary. While the system is intended primarily for use in mass produced vehicles as a preoiler, it will be seen that the assembly is also of value to performance enthusiasts and that it can be adapted for use on strictly performance vehicles. The unit comprised of the cylinder and solenoid valve performs its desired preoiling and backup functions with only three moving parts and with a minimum of space consumption or weight. The assembly is virtually maintenance free and is easily disassembled in the rare case that maintenance or the like may be required. The solenoid actuated valve, as has been discussed previously, performs the three functions of allowing full oil flow during preoiling, restricting recharge while the engine builds pressure, and permitting rapid recharge once the engine has attained a suitable level of pressure. All of this is accomplished by a valve assembly having only two moving parts.

While a preferred embodiment of an engine preoiler and lubricant reservoir in accordance with the present invention has been hereinabove fully and completely described, it will be obvious to one of ordinary skill in the art that a number of changes in, for example, the shape and capacity of the cylinder, the material used for its construction, the outer shape of the valve assembly, and the materials used for the valve assembly and diaphragm could be made without departing from the true spirit and scope of the invention and that, accordingly, the invention is to be limited only by the appended claims.

I claim:

1. A preoiler and lubricant reservoir assembly useable to lubricate and internal combustion engine when the engine's oil pressure is below a specified level, said assembly comprising:
   a reservoir, said reservoir being an elongated cylinder, said cylinder having an internal slidable piston, said reservoir storing a quantity of lubricant when said engine oil pressure is above said specified level;
   a pressure sensing means for sensing said engine's oil pressure;
   means for forcing said lubricant from said reservoir when said oil pressure falls below said level; and
   valve means communicating with said reservoir, said valve means allowing unrestricted flow of said lubricant from said reservoir to the engine when the engine's oil pressure is below the specified level, said valve means further restricting lubricant flow to said reservoir during increasing oil pressure in said engine while said pressure is below said specified level, and said valve means allowing unrestricted lubricant flow to said reservoir once said oil pressure in the engine has risen above said specific level, said valve means including actuating means for controlling said valve means in response to said engine oil pressure sensed by said pressure sensing means.

2. The assembly of claim 1 wherein said piston divides said cylinder into first and second sections, said lubricating fluid being stored in said first section and further wherein said second section includes means to supply pressurizing air to said second section.

3. The assembly of claim 1 wherein said valve means includes a solenoid actuating means having a movable plunger.

4. The assembly of claim 3 wherein said solenoid actuating means is electrically connected with said pressure sensing means whereby said valve means is controlled in response to said engine oil pressure sensed by said pressure sensing means.

5. The assembly of claim 4 further wherein said valve means includes a valve body and valve cover with a diaphragm positioned between said body and cover.

6. The assembly of claim 5 wherein said valve body is divided into first and second chambers by a partition, said diaphragm contacting said partition and further defining said first and second chambers and cooperating with said cover to define a third chamber, and further wherein said first and second chambers are in fluid communication with said engine and said reservoir respectively.

7. The assembly of claim 6 further wherein said diaphragm includes first and second orifices, said first orifice allowing fluid flow between said first and third chambers, said second orifice allowing fluid flow between said second and third chambers.

8. The assembly of claim 7 wherein said first orifice is an opening of substantially twice the area of said second orifice.

9. The assembly of claim 8 wherein said plunger closes said first orifice when said plunger engages said diaphragm whereby while said plunger is moved away from said diaphragm when said solenoid is actuated, flow of said lubricant through said second chamber to said third chamber allows said diaphragm to be moved out of contact with said partition to allow said unrestricted flow from said second chamber to said first chamber and to the engine when the oil flow is below said specified level, said first orifice allowing flow to said third chamber as said oil pressure increases but is below said specified level, such flow to said third chamber from said first chamber being greater than said flow from said third chamber to said second chamber thereby moving said diaphragm into contact with said partition to restrict flow to said reservoir until said engine oil pressure has risen above said specified level to deactuate said solenoid thereby allowing said plunger to contact said diaphragm and close said first orifice and allowing said oil pressure to move said diaphragm out of contact with said partition to allow unrestricted lubricant flow from said first chamber to said second chamber to refill said reservoir.

* * * * *